Figure 4:
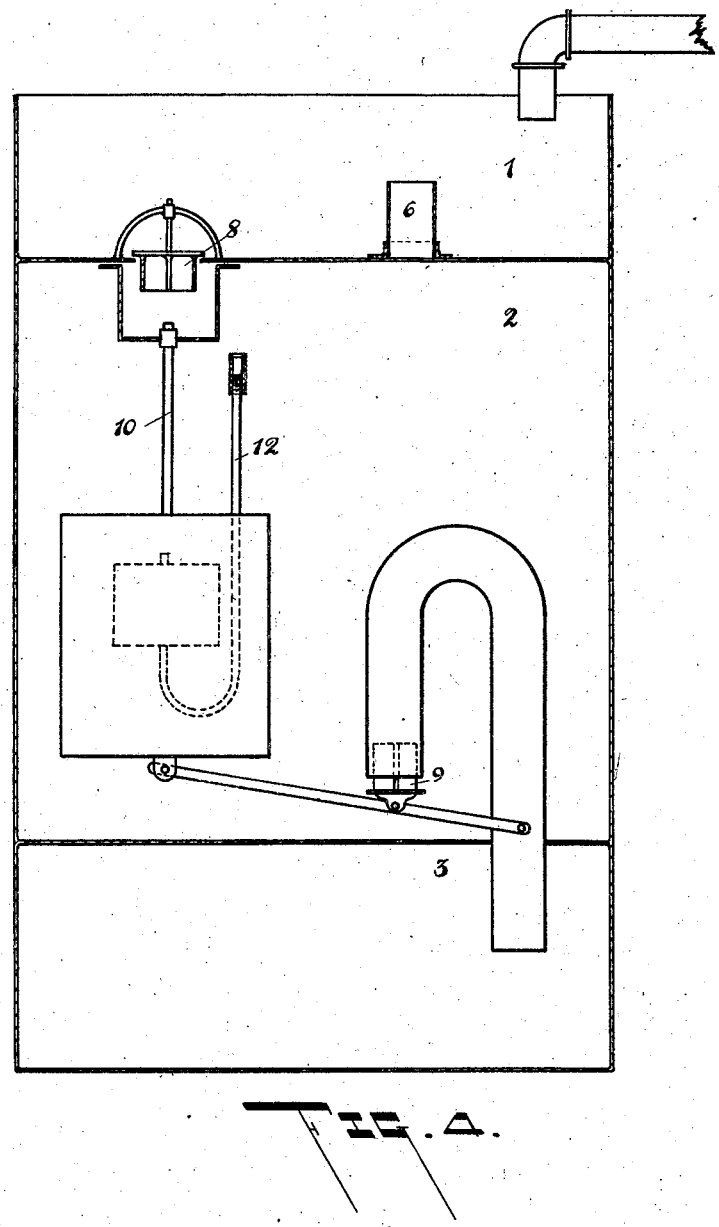

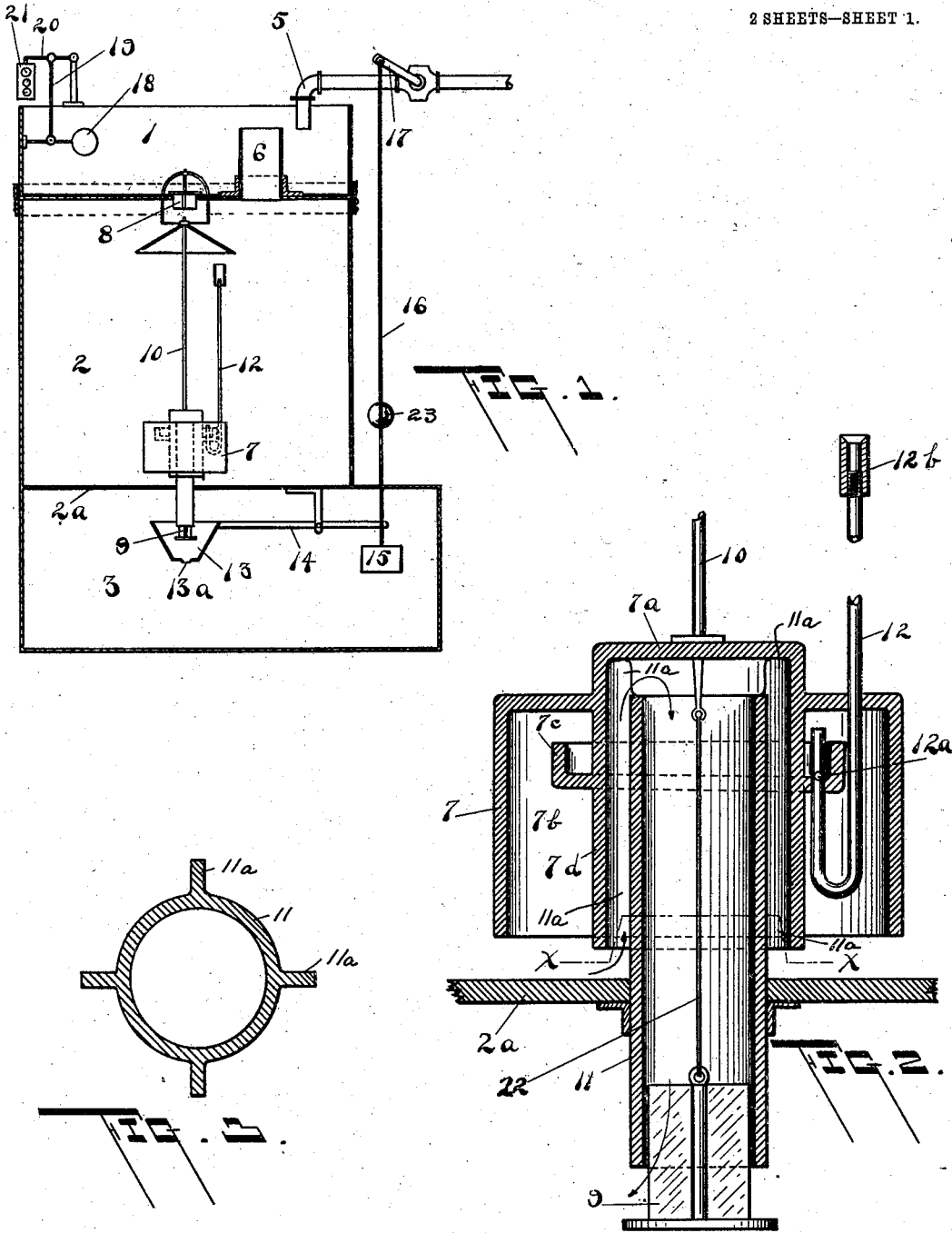

No. 785,224. PATENTED MAR. 21, 1905.
F. N. LOWRY.
AUTOMATIC MEASURING TANK.
APPLICATION FILED MAY 16, 1904.

2 SHEETS—SHEET 2.

WITNESSES.
W. I. Cathcart.
J. S. See.

Fred N. Lowry. INVENTOR

BY

Geo. B. Willcox. ATTORNEY

No. 785,224.                                    Patented March 21, 1905.

UNITED STATES PATENT OFFICE.

FREDERICK NICHOLS LOWRY, OF MIDLAND, MICHIGAN.

AUTOMATIC MEASURING-TANK.

SPECIFICATION forming part of Letters Patent No. 785,224, dated March 21, 1905.

Application filed May 16, 1904. Serial No. 208,253.

*To all whom it may concern:*

Be it known that I, FREDERICK NICHOLS LOWRY, a citizen of the United States, residing at Midland, in the county of Midland and State of Michigan, have invented certain new and useful Improvements in Automatic Measuring-Tanks; and I do hereby declare the following to be a full, clear, and exact description of the invention, such as will enable others skilled in the art to which it appertains to make and use the same.

This invention is a device for automatically measuring the quantity of fluid being discharged from a pipe or other conduit and for intermittently discharging the measured quantity into a suitable receptacle.

The improvements consist in certain devices, their combination, and the equivalents thereof, as will be more fully set forth in this specification and pointed out in the claims.

The invention provides means for preventing the inflow of liquid into the measuring-compartment of the apparatus while the previously-measured quantity is being discharged therefrom and means for quickly delivering into the measuring-compartment liquid which has been accumulating during the time required for emptying the previous charge from the measuring-compartment. Means is also provided for quickly opening the discharge-valve to permit the escape of liquid from the measuring-compartment the instant the liquid inside the compartment rises to a certain predetermined level, the measuring-compartment having been previously calibrated to contain a given volume of liquid at the instant of discharge.

The invention also provides means for automatically shutting off the supply-conduit while the liquid is being discharged from the measuring-compartment and provides for automatically shutting off the supply when the receptacle is full.

With these and certain other objects in view, which will appear further in the specification, the invention consists in the devices illustrated in the accompanying drawings, in which—

Figure 1 is a vertical sectional view of the measuring device. Fig. 2 is a vertical sectional detail of the discharge-valve and its controlling mechanism. Fig. 3 is a cross-section taken on the line $x\ x$ of Fig. 2. Fig. 4 is a vertical section showing a modified arrangement of the discharge-valve and its operating devices.

As is clearly shown in the drawings, the device consists in a tank having a receiving-compartment 1, a measuring-compartment 2, and the chamber 3 for receiving the liquid discharged from the measuring-compartment.

In this specification I will refer to the three compartments as being in the location shown in Fig. 1, it being understood that the shape, size, and relative locations of the three compartments may be varied to any extent consistent with the proper working of the measuring mechanism without departing from the spirit of my invention.

The measuring device is capable of being used alone without the compartments 1 and 3 or with either of them.

Liquid—such as water, brine, or other substance to be measured—is supplied to the apparatus by means of the supply-conduit 5 and accumulates in the receiving-chamber 1 until the level rises above the top of a stand-pipe 6, which opens into the measuring-compartment 2. As the liquid flows over the top of the pipe 6 and accumulates in the bottom of the measuring-tank 2 the level in the tank 2 gradually rises to such a height as to lift the inverted cup or float 7, by which the admission and discharge valves 8 and 9 of the measuring-chamber are actuated. The preferable construction of the inverted cup 7 is illustrated in Fig. 2, it being understood that the size, shape, and arrangement of the parts may be varied to any extent consistent with its proper working. This cup, as shown, is of substantially the form of an annular ring closed at the top and open at the bottom.

By reason of the buoyancy of entrained air the cup floats when the liquid in the measuring-compartment rises above its lower edge. The top of the central portion of the cup 7 is formed with an air-tight cover $7^a$, which may be integral with the cup 7, if desired, and to the central portion of the top $7^a$ is fixed a vertical rod or other suitable member 10, that is carried up and down by the cup 7 as it rises and falls with the liquid-level. Fixed to the bottom $2^a$ of the measuring-compartment 2 and projecting down through said bottom and up into the central opening of the cup 7 is a discharge-pipe 11, by which the liquid is delivered from the measuring-compartment into the chamber 3. A valve 9 is provided in the bottom of the discharge-pipe 11 and is connected to the top $7^a$ of the cup 7 by means of a rod, chain, or other suitable connection 22, whereby the valve 9 is raised, and thereby closed to prevent discharge of liquid from the pipe 11 when the cup 7 is raised by the rising liquid in the measuring-compartment 2.

To keep the cover $7^a$ the proper distance above the pipe 11, I prefer to extend upward the four guides $11^a$, (shown in Fig. 3,) the office of which is to keep the pipe 11 and the shell $7^d$ concentric. The extended upper ends of guides $11^a$ thus form a seat for the cover $7^a$. It is thus seen that the first effect of the liquid that overflows the top of the pipe 6 is to raise the cup 7, and thereby close the discharge-valve 9. In the floor of the receiving-compartment 1 is located a valve 8, which is opened by contact with the upper end of the rod 10 as the latter rises with the cup 7, so that almost simultaneously with the closing of the discharge-valve 9 occurs the opening of the inlet-valve 8, which permits the liquid stored in compartment 1 and previously overflowing the top of pipe 6 to suddenly flow through the valve 8 into the measuring-compartment, leaving the receiving-compartment 1 empty except for the continued discharge through it of the supply-stream from the conduit 5. The buoyancy of the inverted cup 7 is such as to forcibly hold closed the discharge-valve 9 and hold open the inlet-valve 8. It is obvious that this condition will remain until the air contained in the inverted cup 7 is permitted to escape.

I will now describe the means by which the air is suddenly released from the cup 7, permitting it to fill with liquid and sink, allowing the contents of the measuring-compartment to siphon over the top of the discharge-pipe 11 through the now open valve 9 and drop into the chamber 3, as indicated by arrows in Fig. 2.

Within the annular space $7^b$, formed by the walls of the cup 7, and near the top of the cup is the upright cup $7^c$, open at the top and forming an annular ring around the inner wall $7^d$ of the cup 7. The bottom of the annular cup $7^c$ is preferably inclined, so that the liquid may be drained from it, as shown in Fig. 2. Starting above or near the level of the top of the cup $7^c$ and passing through the bottom of the cup $7^c$ at its low side is a U-shaped pipe 12, which extends down to a point above the level of the lower edge of the cup 7 and is then bent back upon itself and passes up to a point above the level of the charge of liquid to be measured. In the tube 12 and close to the bottom of the cup $7^c$ are small holes $12^a$, by which the cup is emptied.

The operation of this device is as follows: The cup $7^c$ having been filled with liquid, the liquid having been admitted into the measuring-chamber 2 through the check-valve 8, as above described, until the level of the liquid in the tank has risen almost to the point of discharge, the pressure of air in the cup 7 has gradually increased with the rise of liquid and the liquid in the cup $7^c$ has thereby been gradually forced through the openings $12^a$ into the bent pipe 12, and when the hydrostatic pressure of the surrounding liquid upon the air in the space $7^b$ becomes greater than that due to the column of liquid in the pipe 12 at that instant the column of liquid in the pipe 12 will be blown out of the top of the pipe by the air displaced from the space $7^b$, and with this resistance removed the remaining air from the space $7^b$ is free to escape and liquid flows in and takes its place. The cup deprived of buoyancy of entrained air sinks, and the liquid in compartment 2 siphons through between the wall $7^d$ and the pipe 11 and drops down through the pipe 11 and the open valve 9 into the chamber 3. As has been previously noted, the valve 8 closes as soon as the cup 7 sinks. Before all the liquid has left the chamber 2 and the siphon through pipe 11 breaks, the space $7^b$ fills with air again, but the cup $7^c$ and pipe 12 retain a quantity of liquid, part of which flows through the openings $12^a$ and fills the looped lower part of the pipe 12 ready for action.

It will be noted that when compartment 2 is emptying chamber $7^b$ gets part of its air by sucking it back through the U-shaped pipe and the rest of it when the liquid falls below the lower edge of 7. Consequently the chamber $7^b$ is filled with air and emptied of its liquid before the siphon breaks. To effect this result, the inner wall $7^d$ is made to extend below the wall of the cup 7.

The pipe 6 serves not only as an overflow from the receiving-chamber 1, but also as an air-vent for the measuring-chamber 2.

The length of pipe 12 determines the level at which the discharge from the measuring-compartment takes place, and in practice I prefer to make the length of this pipe adjustable by any suitable means, such as is shown in Figs. 1 and 2, where $12^b$ is a threaded pipe screwed over the end of pipe 12. By screwing this pipe $12^b$ up or down the effective length of pipe 12 may be adjusted within reasonable limits, so that the quantity of liquid contained in chamber 2 at the instant of discharge can be easily and accurately regulated.

In the device above described I have assumed a constant flow of liquid through the conduit 5. In this case it is necessary to store the liquid delivered from 5 while the valve 8 is closed and the measured liquid is being discharged from chamber 2. In cases where it is desirable to stop the flow through the conduit 5 while the tank 2 is discharging the receiving-compartment 1 may be dispensed with. In such cases I provide below the discharge-valve 9 a receptacle 13, having a small opening 13ª in its bottom and mounted on a pivoted lever 14, the outer end of which carries a float 15, which is used to close the shut-off valve when the receptacle is full. To the lever 14 is attached a rod 16, connected at its upper end to the handle of a shut-off valve provided in the conduit 5. A suitable counterbalance-weight 23 is secured to the rod 16. In this case the liquid discharged through valve 9 drops into the receptacle 13, and since it flows in faster than it can flow out through the opening 13ª it overflows the receptacle 13, and by its weight, acting through the levers 14 and 17 and the rod 16, it holds the shut-off valve closed. When the flow from valve 9 ceases, the liquid contained in the receptacle 13 is discharged through the opening 13ª, and by means of the weight 23 the valve 17 is again opened and liquid flows through the conduit 5 as before.

A record may be kept of the number of measured quantities discharged from chamber 2 by a suitable counting mechanism—as, for instance, by the float 18, shown in chamber 1. The counting mechanism may be placed in chamber 2 when necessary. The float may be connected by a link 19 and lever 20 with a suitable mechanical counter 21.

By the means above described I have produced an automatic liquid-measuring device having few moving parts and not liable to get out of order and capable of measuring with the utmost accuracy and uniformity large quantities of liquid taken from a continuously or intermittently flowing pipe or conduit. The uses to which this invention may be applied are varied, as it is applicable to any conditions where an easy-flowing liquid is to be measured. The device measures accurately the volume of the liquid, and if the density is known the weight of the charge may be accurately determined, or any one charge can be weighed and the total weight computed from the number of charges passing through the device, or the device may be adjusted to measure a given volume or weight of liquid.

One method I have used successfully to calibrate for the desired charge is to accurately weigh or measure one charge, put it into the compartment 2, then adjust the extension 12ᵇ of the U-shaped pipe until the liquid is blown out, as previously described. The device will thereafter discharge that amount each time. The top section 12ᵇ of the pipe 12 can be made long or short, as circumstances may require.

Let it be understood that the design of the inverted cup shown by the drawings is only one of several embodiments to accomplish the same object; that the inverted cup and the siphon through which the liquid from the measuring-compartment is discharged may be apart from each other, as shown in Fig. 4. The discharge-valve 9 may be above or below the bottom compartment 2—in fact, any arrangement of the parts so long as there is a blow-pipe to hold the desired static head of liquid, a cup or chamber to automatically catch and supply to the blowpipe at every discharge of the measuring-compartment sufficient liquid to supply this desired static head, and so long as there is an inverted cup the buoyancy of which automatically operates the admission and discharge valves 8 and 9 of the measuring-compartment—in fact, any arrangement of the parts consistent with the proper working of the controlling mechanism may be used without departing from the spirit of my invention.

While I have shown and described pipe 12 as being vertical, with a U-shaped lower end, I do not wish to confine myself to this particular form, for the pipe 12 may be any pipe so arranged that the quantity of liquid in the measuring-tank is controlled by the hydrostatic pressure of the column of liquid in said pipe.

What I claim as my invention, and desire to secure by Letters Patent, is as follows:

1. In a device for automatically measuring fluids, the combination with a receiving-compartment, a measuring-compartment and a discharge-chamber; of an inlet-valve connecting the receiving-compartment with the measuring-compartment; a discharge-pipe connecting the measuring-compartment with the discharge-chamber; a discharge-valve located in said pipe; an inverted cup inclosing the upper end of said pipe; a rod secured to said cup and adapted to actuate said inlet-valve; an upright cup within said inverted cup; and a U-shaped pipe connecting with said upright cup and projecting above the discharge-level of the liquid.

2. In a device for automatically measuring fluids the combination with a measuring-compartment; of a receiving-compartment having a valve communicating with the measuring-compartment; a discharge-pipe located in the bottom of the measuring-compartment; a discharge-valve in said pipe; an inverted cup inclosing the upper end of said pipe; a rod secured to said cup and adapted to actuate said inlet-valve; a rod secured at its upper end to said inverted cup and at its lower end to the discharge-valve; an upright cup within said inverted cup; and a U-shaped pipe connecting with said upright cup and projecting above the discharge-level of the liquid.

3. In a device for automatically measuring liquids, the combination with a receiving-compartment, a measuring-compartment and a discharge-chamber; of an inlet-valve connecting the receiving-compartment with the measuring-compartment; a discharge-pipe connecting the measuring-compartment with the discharge-chamber; a discharge-valve located in said pipe; an inverted cup within the measuring-compartment and adapted by its buoyancy when filled with air to hold open the inlet-valve and to hold closed the discharge-valve; together with means for automatically discharging the air from said inverted cup when the level of the liquid in the measuring-tank has reached a predetermined position.

4. In a device for automatically measuring liquids, the combination with a receiving-compartment, a measuring-compartment and a discharge-chamber; of an inlet-valve connecting the receiving-compartment with the measuring-compartment; a discharge-pipe connecting the measuring-compartment with the discharge-chamber; a discharge-valve located in said pipe; an inverted cup within the measuring-compartment and adapted by its buoyancy when containing air to hold open the inlet-valve and to hold closed the discharge-valve; together with a pipe connecting the air-space of said inverted cup with the air-space of said measuring-tank; the upper end of said pipe being located near the predetermined discharge-level of the measuring-tank.

5. In a device for automatically measuring liquids, the combination with a receiving-compartment, a measuring-compartment and a discharge-chamber; of an inlet-valve connecting the receiving-compartment with the measuring-compartment; a discharge-pipe connecting the measuring-compartment with the discharge-chamber; a discharge-valve located in said pipe; an inverted cup within the measuring-compartment and adapted by its buoyancy when containing air to hold open the inlet-valve and to hold closed the discharge-valve; together with an upright cup inclosed within said inverted cup, said upright cup being provided with a pipe, the upper end of said pipe being located near the predetermined discharge-level in said tank; substantially as described.

6. A valve-actuating float for devices of the class described, comprising an inverted annular cup; an upright cup inclosed within said inverted cup; a U-shaped pipe communicating with said upright cup and projecting up above the inverted cup, for the purposes set forth.

7. A valve-actuating float for devices of the class described, comprising an inverted cup; an upright cup inclosed within said inverted cup; a U-shaped pipe communicating with said upright cup and projecting up above the inverted cup, for the purposes set forth.

8. In a liquid-measuring device, means for actuating the inlet and discharge openings of said device, said means comprising in combination with an air-chamber subjected to hydrostatic pressure of the liquid being measured, a pipe communicating with said chamber said pipe being adapted to automatically release air from said chamber when the pressure produced therein by the hydrostatic head of the liquid being measured reaches a predetermined amount, for the purpose set forth.

9. In a liquid-measuring device, means for actuating the inlet and discharge valves of said device, said means comprising in combination with an air-chamber subjected to hydrostatic pressure of the liquid being measured, a pipe communicating with said chamber and adapted to automatically form a water seal in said pipe to automatically release air from said chamber when the pressure produced therein by the hydrostatic head of the liquid being measured reaches a predetermined amount, for the purposes set forth.

10. In a liquid-measuring device, an air-chamber having its upper part air-tight, the air contained therein being subject to the hydrostatic pressure of the liquid being measured; together with a liquid-containing pipe communicating with said air-chamber and adapted to automatically release the air therefrom when the pressure exerted upon the air in said chamber by the liquid being measured exceeds the counter-pressure of the liquid in said pipe.

In testimony whereof I affix my signature in presence of two witnesses.

FREDERICK NICHOLS LOWRY.

Witnesses:
L. I. NORTHWAY,
JAS. J. SAVAGE.